THERMOELECTRIC DEVICE AND METHOD OF MANUFACTURE

Filed Aug. 29, 1966

Inventor
Stanford R. Ovshinsky
By: Wallenstein, Spangenberg, Hattis & Strampel
attys.

United States Patent Office 3,528,856
Patented Sept. 15, 1970

3,528,856

THERMOELECTRIC DEVICE AND METHOD OF MANUFACTURE

Stanford R. Ovshinsky, Bloomfield Hills, Mich., assignor to Energy Conversion Devices, Inc., Troy, Mich., a corporation of Delaware Continuation-in-part of application Ser. No. 198,308, May 28, 1962, which is a continuation-in-part of application Ser. No. 145,136, Oct. 16, 1961. This application Aug. 29, 1966, Ser. No. 575,895
Int. Cl. H01m 29/00
U.S. Cl. 136—83 13 Claims

ABSTRACT OF THE DISCLOSURE

A high temperature voltage and current generating device includes an open ended container, a layer of lithium metal in the container, and a layer of a composition in the container in intimate contact with the layer of lithium metal and including as an essential ingredient at least one lithium compound. The device is heated to an elevated temperature for generating substantial D.C. voltage and current in the electrical circuit.

Figure 1:
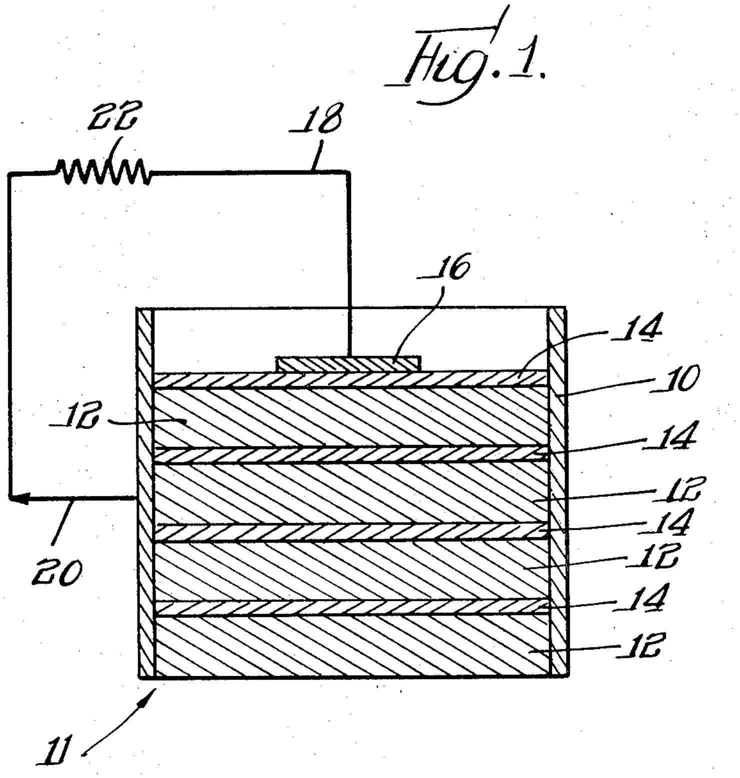

This application is a continuation-in-part of copending application Ser. No. 198,308 filed May 28, 1962 which is a continuation-in-part of application Ser. No. 145,136 filed Oct. 16, 1961 and now abandoned.

This invention relates to novel thermoelectric materials, useful for the generation of voltage and/or electrical power in response to the application of heat. It also relates to thermoelectric devices incorporating such thermoelectric materials, and to processes for preparing such materials. The term "thermoelectric" is used here in a broad sense, meaning the generation of electricity by the application of heat.

This invention is based on the discovery of certain novel thermoelectric or voltage and current generating effects of lithium in conjunction with various of its compounds.

An object of this invention is to provide a thermoelectric material capable of generating an exceptionally high voltage upon the application of heat thereto.

Another object of this invention is to provide thermoelectric materials capable of generating high power flux densities upon the application of heat thereto, high power output being obtained with low weights of active materials.

One advantage of the invention is that it makes it possible to produce substantial electrical power output from waste heat sources, with devices having very low cost, requiring little space, and being low in weight.

Another advantage is that it provides a thermoelectric material capable of use as a thermally responsive indicator or control device capable of generating a substantial voltage indicating signal and/or substantial electrical power for operation or actuation of a control device.

Other objects and advantages will more fully appear from the following description and drawing, wherein are disclosed preferred embodiments of the invention.

Figure 2:
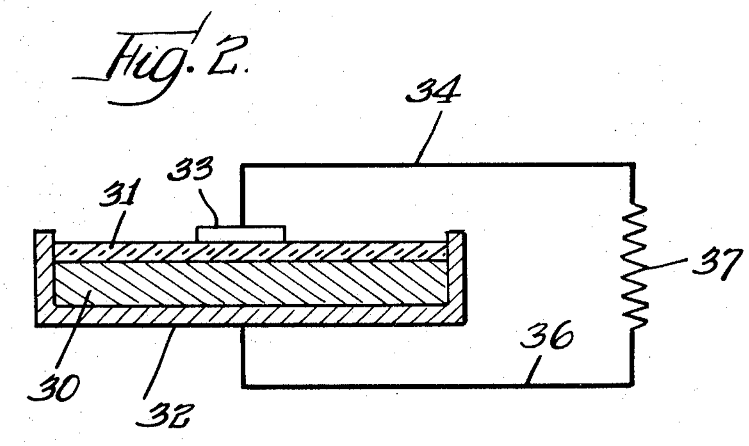

In the drawing:

FIG. 1 represents a schematic diagram of one preferred embodiment of the invention; and FIG. 2 represents another schematic diagram of another preferred embodiment of the invention.

I have discovered that bodies comprising lithium metal having a coating or film or layer thereon of a composition including one or more of various lithium compounds have unusual electrical properties and are capable of functioning very effectively as thermoelectric materials for generating substantial D.C. voltages and currents. Such bodies, upon the application of spaced electrical contacts to the lithium metal and to the coating or film or layer of such lithium compound compositions, produce very high open circuit voltages, of the order of 1.5 to 2.5 volts; and, under certain circumstances, when exposed to high temperatures, they produce large current flow, of the order of 1 ampere and even higher, at somewhat lower voltages.

The lithium compound compositions which can be utilized as coatings or films or layers on the lithium metal include, among others, lithium oxide, lithium hydroxide, lithium nitride, lithium carbonate, lithium orthophosphate, lithium metaborate, lithium silicates, lithium sulfate, lithium nitrate, lithium metaphosphate, lithium metasilicate, lithium fluoride, lithium chloride, and mixtures of any two or more thereof; including, for example, compositions obtained by essentially fully or completely burning lithium metal in air or oxygen, these compositions possibly comprising mixtures of lithium carbonate, lithium oxide and lithium hydroxide. The compositions including the aforesaid lithuim compounds or mixtures of said compounds can be coated or filmed onto the lithium metal in a variety of ways. Thus, for example, the lithium compound compositions may be fused and then coated onto a disc or sheet or layer of the lithium metal. Alternatively, they may be admixed with an organic resinous binder, for example, a methyl methacrylate resin, coated on the lithium metal, and then the binder may be burned off. The desired composite article may, in another embodiment, be obtained simply by allowing a disc or sheet or layer or other desirably shaped piece of lithium metal to stand in air under normal atmospheric conditions whereupon, very quickly, its surface becomes coated with a film of what may be a mixture of at least lithium hydroxide and lithium carbonate.

It has been found that it is especially advantageous to utilize lithium oxide in conjunction with lithium metal. Also, it is particularly desirable to take a suitably shaped piece of lithium metal, ignite it, and allow it to burn in air for a brief time well short of completely burning the lithium metal, and then limit the supply of air so that the final heating occurs essentially in a nitrogen atmosphere. This can easily be done by starting the ignition of the lithium metal in air by heating, and then covering the ignited lithium. Under these conditions, the final article obtained is a body or layer of lithium metal which carries a coating or layer of what may be a mixture containing lithium nitride and other lithium compounds, possibly, lithium hydroxide and lithium carbonate and possibly, also, lithium oxide. In connection with this latter procedure, where high power generation is desired, the lithium metal should not be completely burned or oxidized since this produces a product devoid or essentially devoid of lithium metal and such product does not possess the high power generation thermoelectric properties of the particularly preferred articles with which the present invention deals. Hence, in the production of the high power generation thermoelectric material of the present invention by use of the preferred procedure described above, it should be emphasized that the ignition and burning of the lithium metal must not be so carried out as to result in dead-burning to a completely oxidized state where no lithium metal as such is present. However, as expressed above, the dead-burned materials do possess utility for voltage generation when applied to a layer or lithium metal.

Reference is first made to FIG. 1 of the drawing which shows schematically one illustrative procedure for producing a thermoelectric device utilizing the ignition technique described above. A hollow metal cylinder 10 is provided containing thermoelectric material indicated generally as 11. The thermoelectric material may, if desired, be produced in situ. Thus, a disc or layer 12 of lithium metal is placed transversely near the bottom of the cylinder. A layer of magnesium dust 14 is preferably (though not necessarily) placed thereover, in order to assist in igniting the lithium. A cover (not shown) is then placed over the top of the cylinder 10 until ignition ceases. The resulting ignition product is tamped into a cohesive layer. Other similar layers of lithium metal 12 and magnesium dust 14 may be added, ignited, and tamped, seriatim, as described above, until the cylinder is approximately full.

An electrode 16, which preferably comprises a metal disc or a helical coil, is placed in contact with the top of the thermoelectric material 11. The cylinder 10 may be made of any suitable metal, such as steel or the like, and the electrode 16 may also be made of any suitable metal, such as steel, iron, chromel, brass, copper or the like, the various metals have no discernible effect upon the operation of the device. An electric lead 18 is attached to said electrode 16, as shown, and another electric lead 20 is attached to the cylinder 10 as shown. An external load 22 may be placed in series with said leads 18 and 20 if it is desired to draw power from the device. The entire device including the upper surface of the composition is exposed to the ambient atmosphere.

In order to activate the device, heat is applied to it to heat the same to an elevated temperature. The device may be uniformly heated as by subjecting it to high temperature conditions, as in a furnace or the like, or it may be non-uniformly heated, as by heating the upper surface thereof to elevated temperature with a flame or the like allowing the remainder of the device to be subject to ambient temperature conditions. For example, when the device is either uniformly or non-uniformly heated to a temperature in the order of 600 to 800 degrees C. or so, open-circuit voltages of about 2.5 volts are obtained. With a suitable external load 22, operating voltages of approximately 1.0 volt are obtained, at a current of approximately 1.0 amp. Thus, about 1 watt of electrical power may be drawn from such a unit, where the diameter of the cylinder 10 is about ½ inch, its height is about ¾ inch, and the area of electrode 16 is about 1/16 square inch. The above dimensions are not necessary for this high output since the diameter of the cylinder and the height thereof can be smaller, and the area of the electrode can vary. I have operated such units for 2.5 hours and more without substantial decrease in power. It will be understood, of course, that various heat sources can be utilized to activate the thermoelectric elements of my invention such as waste heat sources, for instance, automobile and rocket exhausts, as well as sunlight and the like.

In the embodiment shown in FIG. 2, a sheet or layer 30 of lithium metal, say 1/16 inch thick, is placed in an open ended container 32, and the sheet or layer 30 of lithium metal is provided with a coating or film or layer of a composition 31 containing one or more lithium compounds, such as those set forth above. One composition layer may be provided in the manner discussed above by igniting the lithium metal and covering the container until ignition stops. Other composition layers may be provided by coating or filming the compositions onto the layer of lithium metal as described above, or by tamping them into the open ended container on top of the layer of lithium metal. Any one or more of the aforementioned lithium compounds may be utilized in so forming the layer or coating 31. A suitable electrode 33 is applied to the composition layer or coating and it and the container are connected by leads 34 and 36 into an electrical circuit which may include a load 37. The particular metals from which the container 32 and the electrode 33 are made do not have any discernible effect upon the operation of the device.

By applying heat to the device of FIG. 2 to heat the device either uniformly or non-uniformly to temperatures of about 400 to 800 degrees C. or so, substantial voltages are generated with high current flow through the load 37. D.C. voltages of about 1 volt and currents of about 1 ampere are readily obtained with the devices of FIG. 2 utilizing composition layers containing one or more of the aforementioned lithium compounds. High open-circuit voltages of about 2½ volts are also obtained. The device of FIG. 2 also has long operative life.

It has also been found that by adding tellurium to the aforementioned lithium compound containing compositions, the devices become more stabilized in their operation and generate voltages and current in a more uniform manner. Tellurium metal powder may be mixed and dispersed in the powdered or granular form of the lithium containing compositions before the layers of the composition are applied to the layer of lithium metal. Where the layer of the composition is formed by igniting the lithium metal in air and covering the same until ignition is terminated, as described above, tellurium metal powder may be sprinkled on the reacting lithium metal so that it will be dispersed in the composition resulting from such ignition. The addition of the tellurium is not in trace amounts but substantial additions thereof are made. For example, in the device of FIG. 1 about 0.3 to 0.8 grams of tellurium metal powder may be added to the reacting lithium metal during each ignition thereof.

In those instances where atmospheric or ambient conditions, such as moisture, are inimical to the storage of the thermoelectric materials of the present invention, as, for example, with lithium oxide, by reducing their shelf life under idle conditions, the thermoelectric units or elements can be encapsulated or housed so as to provide a protective environment as, for example, stainless steel or other metal housings, and the units or elements may be maintained in a dry atmosphere or in inert gaseous atmospheres such as helium, argon, nitrogen or the like.

It has not been fully ascertained whether the devices of my invention are thermoelectric generators in the classical sense or whether there may be some galvanic or chemical effect which is responsible for or contributes to the remarkable effects achieved by this invention. It is possible that there may be some chemical reaction between the ambient atmosphere and the thermoelectric material 11 and/or between the lithium metal and the lithium compound. Regardless of what the full explanation may be, it is clear that I am able, through my invention to produce very small, compact, lightweight units capable of generating substantial quantities of electricity and electric power in response to the application of heat. It is in this sense, therefore, that I employ the term "thermoelectric."

While I have thus described preferred embodiments of my invention, changes may be made in the details without departing from the spirit of the invention, the principal novel features of which are set forth and claimed below.

I claim:

1. A high temperature voltage and current generating device consisting essentially of an open ended container, at least one layer of lithium metal in said container, at least one layer of a composition in said container in intimate contact with said at least one layer of lithium metal and including as an essential ingredient at least one lithium compound, at least a portion of the outer surface of at least one composition layer being exposed through the open end of the container to air, an electrical circuit including electrical connections respectively to said at least one layer of lithium metal and to said at least one composition layer adjacent the exposed outer surface thereof, and means for heating the device to an elevated temperature for generating substantial D.C. voltage and current in said electrical circuit, at least one layer of lithium metal being disposed in said container in such manner as not to be directly contacted by air during generation of said D.C. voltage and current.

2. The combination of claim 1 wherein said at least one lithium compound comprises lithium nitride.

3. The combination of claim 1 wherein said at least one lithium compound comprises oxygen containing lithium compounds.

4. The combination of claim 1 wherein said at least one lithium compound comprises lithium nitride and oxygen containing lithium compounds.

5. The combination of claim 1 wherein said composition also includes tellurium as an essential ingredient.

6. The combination of claim 2 wherein said composition also includes tellurium as an essential ingredient.

7. The combination of claim 3 wherein said composition also includes tellurium as an essential ingredient.

8. The combination of claim 4 wherein said composition also includes tellurium as an essential ingredient.

9. The combination of claim 1 wherein said at least one lithium compound comprises lithium oxide, lithium hydroxide, lithium nitride, lithium carbonate, lithium orthophosphate, lithium metaborate, lithium silicates, lithium sulfate, lithium nitrate, lithium metaphosphate, lithium metasilicate, lithium fluoride, or lithium chloride or mixtures of any two or more thereof.

10. The combination of claim 9 wherein said composition also includes tellurium as an essential ingredient.

11. The method of making a high temperature voltage and current generating device comprising placing at least one layer of lithium metal in an open ended container, providing at least one layer of a composition, including as an essential ingredient at least one lithium compound, on and in intimate contact with said at least one layer of lithium metal in the container and with at least one layer of said composition exposed through the open end of the container to air, and electrically connecting an electrical circuit by making electrical connection to said at least one layer of lithium metal and to said at least one composition layer adjacent the exposed outer surface thereof respectively, whereby said device generates substantial D.C. voltage and current when the device is heated to an elevated temperature, at least one layer of lithium metal being disposed in said container in such manner as not to be directly contacted by air during generation of said D.C. voltage and current.

12. The method as defined by claim 11 wherein the layer of the composition is provided by applying the layer of the composition to the surface of the layer of lithium metal.

13. The method as defined by claim 11 wherein the layer of the composition is provided by initially igniting the layer of lithium metal in air in the open ended container and continuing ignition in the container with the open end thereof closed until ignition is terminated.

References Cited

UNITED STATES PATENTS

| | | | |
|---|---|---|---|
| 2,081,926 | 6/1937 | Gyuris | 136—83.1 |
| 3,057,945 | 10/1962 | Rinnovatore et al. | 136—83 |
| 3,208,882 | 9/1965 | Markowitz | 136—86 |

OTHER REFERENCES

J. M. Mellor, Inorganic Chemistry, the Nitrides, pp. 97–104, vol. 8 QD31/M4 1937.

A. B. CURTIS, Primary Examiner